Patented July 16, 1929.

1,721,485

UNITED STATES PATENT OFFICE.

JULIUS KERSTEN, OF BENSHEIM-ON-THE-BERGSTRASSE, GERMANY.

PROCESS FOR THE DECOMPOSITION OF CHLORIDES AND SULPHATES OF ALKALI-EARTH METALS IN MOLTEN STATE BY STEAM.

No Drawing. Application filed November 18, 1924, Serial No. 750,694, and in Germany November 15, 1923.

It is generally known that magnesium chloride decomposes by the action of steam according to the formula $$MgCl_2 + H_2O = MgO + 2HCl.$$

It has however not yet been possible to carry out this proceeding technically in an economical manner. Hitherto one has proceeded in adding magnesia to the magnesium chloride solution in order to obtain solid magnesium oxychloride and in conducting the steam over the same. This manner of producing oxide chloride is rather troublesome and expensive and the decomposition takes place with difficulty only as the steam does not easily penetrate into the solid mass.

These inconveniences are obviated by the present invention which makes it unnecessary to produce the oxychloride and permits of ensuring an intimate contact between the steam and the magnesium chloride as the steam is made to filter through the molten magnesium chloride. The solid magnesium chloride is previously admixed with a substance which is not too difficult to melt, for instance rock salt. The magnesia obtained at the decomposition is insoluble and would consequently prevent at first during the decomposing process the filtering through of the steam. To prevent this the fusible substance is added in which the magnesia which is produced floats and through which the steam can freely pass. After the decomposition has been completed the steam is shut off and the molten mass, which bubbles vividly so long as the steam is passing through, settles down. The magnesia sinks on the bottom, the molten mass on the top is drawn off and the magnesia is separated in this manner from the molten mass.

In order to facilitate the decomposition of the magnesium chloride and to maintain the heat, which is required for keeping in flux the previously molten mixture of magnesium chloride and for instance rock salt during the decomposing process, carbon or carbonaceous substances of any convenient kind, as for instance charcoal, anthracite, saw dust and the like, are added to this mixture in any state and air is blown through the molten mass besides steam. By the action of the steam on the incandescent carbon besides the carbonic oxide carbon dioxide and hydrogen are produced which act in statu nascendi upon the magnesium chloride. Hydrochloric acid and magnesium are formed which in statu nascendi causes together with the steam in the exothermic process, besides the formation of magnesia, the re-formation of hydrogen according to the formulae:

$$MgCl_2 + H_2 = 2HCl + Mg.$$
$$Mg + H_2O = MgO + H_2.$$

This proceeding takes place simultaneously with the third action of the steam.

The conversion into the hot liquid state of the magnesium chloride and of the other substance, which serves for the purpose to enable the passing of the steam up to complete decomposition, is preferably effected either together in one or separately in two melting furnaces or in a shaft-like furnace the upper zone of which serves as melting furnace. In the two first mentioned arrangements the molten mass produced is introduced into an oven similar to a converter or working continuously in uniform flow, whereupon steam and air are blown in through the inflow nozzles in the bottom or in the side walls of the furnace, or in any other convenient manner, so that steam and air must flow directly into the molten mass and come in intimate contact with the same. The converter must evidently be rotated from the charging position into the working position. In certain cases direct internal heating of the molten mass by combustion air blown in and acting upon the carbon might be unnecessary, external heating of the oven or indirect internal heating, for instance gas heating, being used. In this case the carbon has however also the chemical effect which has been described The converter can be constructed in such a manner that it has a lateral bulged out part which, at the horizontal position of the converter, serves as trough to be heated by gas furnace. A van furnace is thus economized.

If the magnesium chloride contains already a sufficient quantity of a fusible substance adapted to enable the steam passing through the molten mass, as for instance in carnallitic rock, it is evidently not necessary to add a fusible substance. This addition of fusible substance is also unnecessary when the decomposition of the molten magnesium chloride has not to be carried through to the end but only so far that there is permanently a molten mass. Other chlorides of the alkali earth metals can be submitted to a similar treatment as that which has been above described with reference to the decomposition of magnesium chloride. Alkali earth sulphates, as for instance calcium sulphate or magnesium sulphate, can be decomposed in a similar manner as magnesium chloride. If magnesium sulphate is used, a fusible substance must be added to permit of the passing of the steam. When kainitic minerals or other minerals containing potassium chloride are used the addition is entirely or partly unnecessary according to the quantity of a fusible substance present. Magnesium sulphate is reduced only to magnesium sulphite or magnesium sulphide so far as it has not previously reacted with alkali metal chloride to form alkali-metal sulphate. The alkali metal sulphate is also reduced to the sulphite or sulphide.

I claim:—

1. Process for decomposition of alkali earth metal salts which consists, in adding carbonaceous material and a fusible substance to the alkali earth metal salt, in melting the mixture by blowing in heating gases, and in blowing superheated steam through the molten mass.

2. Process for decomposition of alkali earth metal salts which consists, in adding carbonaceous material and rock salt to the alkali earth metal salt, in melting the mixture by blowing in heating gases, and in blowing superheated steam through the molten mass.

3. Process for decomposition of alkali earth metal salts which consists, in adding carbonaceous material and rock salt to the alkali earth metal salt, in melting the mixture by blowing in heating gases and hot air, and in blowing superheated steam through the molten mass.

In testimony whereof I affix my signature.

Dr. JULIUS KERSTEN.